United States Patent
Fujio et al.

(10) Patent No.: US 8,264,588 B2
(45) Date of Patent: *Sep. 11, 2012

(54) DIGITAL CAMERA

(75) Inventors: Shigenori Fujio, Saitama (JP); Teppei Okamoto, Saitama-ken (JP); Tomohiko Kanzaki, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 555 days.

This patent is subject to a terminal disclaimer.

(21) Appl. No.: 12/333,660

(22) Filed: Dec. 12, 2008

(65) Prior Publication Data

US 2009/0153721 A1   Jun. 18, 2009

(30) Foreign Application Priority Data

Dec. 17, 2007   (JP) ................................. 2007-325067

(51) Int. Cl.
   *H04N 5/222* (2006.01)
(52) U.S. Cl. ................................. 348/333.12; 348/240.2
(58) Field of Classification Search ............. 348/333.11, 348/333.12, 333.05, 345, 346, 349, 240.2
   See application file for complete search history.

(56) References Cited

U.S. PATENT DOCUMENTS

| | | | |
|---|---|---|---|
| 7,113,209 B2 * | 9/2006 | Asada | 348/240.1 |
| 7,136,096 B1 * | 11/2006 | Yamagishi et al. | 348/218.1 |
| 7,224,393 B2 * | 5/2007 | Ojima et al. | 348/333.03 |
| 7,697,054 B2 * | 4/2010 | Cazier et al. | 348/333.05 |
| 7,714,926 B2 * | 5/2010 | Kobayashi et al. | 348/333.11 |
| 7,924,340 B2 * | 4/2011 | Kato | 348/333.05 |
| 2005/0097475 A1 * | 5/2005 | Makioka et al. | 715/792 |
| 2005/0190280 A1 * | 9/2005 | Haas et al. | 348/333.05 |
| 2006/0087520 A1 * | 4/2006 | Ito et al. | 345/660 |
| 2006/0170807 A1 * | 8/2006 | Abe et al. | 348/333.05 |
| 2007/0046804 A1 * | 3/2007 | Hirano et al. | 348/333.01 |
| 2007/0291154 A1 * | 12/2007 | Moon et al. | 348/333.05 |
| 2008/0025712 A1 * | 1/2008 | Furuya | 396/88 |
| 2008/0036868 A1 | 2/2008 | Furumochi | |
| 2008/0036904 A1 | 2/2008 | Taneoka | |
| 2008/0049119 A1 | 2/2008 | Yamamoto | |
| 2008/0055453 A1 * | 3/2008 | Battles et al. | 348/333.05 |
| 2008/0175582 A1 | 7/2008 | Furumochi | |
| 2008/0199176 A1 | 8/2008 | Kurosawa | |
| 2008/0244406 A1 * | 10/2008 | Ikehata et al. | 715/718 |

(Continued)

FOREIGN PATENT DOCUMENTS

JP   2005-27035   1/2005

(Continued)

OTHER PUBLICATIONS

English Translation of JP PAT 2006-005640/Abstract, Kageyama Takashi, Imaging Device, and Its Control Method, Program, and Storage Medium, Date May 1, 2006, pp. 1-12.*

(Continued)

*Primary Examiner* — Aung S Moe
(74) *Attorney, Agent, or Firm* — Greenblum & Bernstein, P.L.C.

(57) ABSTRACT

A digital camera has a display, a magnification input device, and a magnification control device. The display simultaneously displays images. The magnification input device is used to input the magnification factor for the images displayed in said display. The magnification control device which simultaneously changes the magnification of the images displayed in said display by substantially the same multiplier according to the magnification factor input by said magnification input device.

20 Claims, 11 Drawing Sheets

U.S. PATENT DOCUMENTS

| | | | |
|---|---|---|---|
| 2008/0252768 A1 | 10/2008 | Suzuki | |
| 2008/0273098 A1* | 11/2008 | Ito | 348/240.2 |
| 2008/0279480 A1* | 11/2008 | Inamoto et al. | 382/305 |
| 2009/0153722 A1* | 6/2009 | Fujio et al. | 348/333.12 |

FOREIGN PATENT DOCUMENTS

| | | |
|---|---|---|
| JP | 2005-86283 | 3/2005 |
| JP | 2006-5640 | 1/2006 |

OTHER PUBLICATIONS

English language Abstract of JP 2005-86283, Mar. 31, 2005.

Japan Office action, dated Dec. 6, 2011 along with an English translation thereof.

\* cited by examiner

DIGITAL CAMERA

BACKGROUND OF THE INVENTION

1. Field of the Invention

The present invention relates to a digital camera having a display, and more particularly, to a digital camera having a control device which magnifies a displayed image in the display.

2. Description of the Related Art

A conventional digital camera having two displays is disclosed in Japanese Unexamined Patent Publication (KOKAI) No. 2005-86283. One display displays a live view which is continuously captured by an image sensor. The other displays a magnified part of the live view or a stored image which has been photographed already. The user photographs by referring to a desired part of an image by shifting or magnifying images which are displayed in the two displays.

However, if the user desires to refer to parts of an image, the user must shift or magnify each image so as to display the desired parts. This is a cumbersome procedure.

Moreover, if the user shifts both images when an edge of one image is displayed on a display, that image may disappear from the display. It may be difficult for the user to restore the lost image on the display.

SUMMARY OF THE INVENTION

An object of the present invention is to provide a digital camera which can simultaneously magnify images displayed in the display so that the user may easily refer to a part of an image.

The present invention is a digital camera having a display, a magnification input device, and a magnification control device. The display simultaneously displays images. The magnification input device is used to input the magnification factor for the images displayed in said display. The magnification control device which simultaneously changes the magnification of the images displayed in said display by substantially the same multiplier according to the magnification factor input by said magnification input device.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

An embodiment of the digital camera according to the present invention is described below with reference to the figures.

Figure 1:
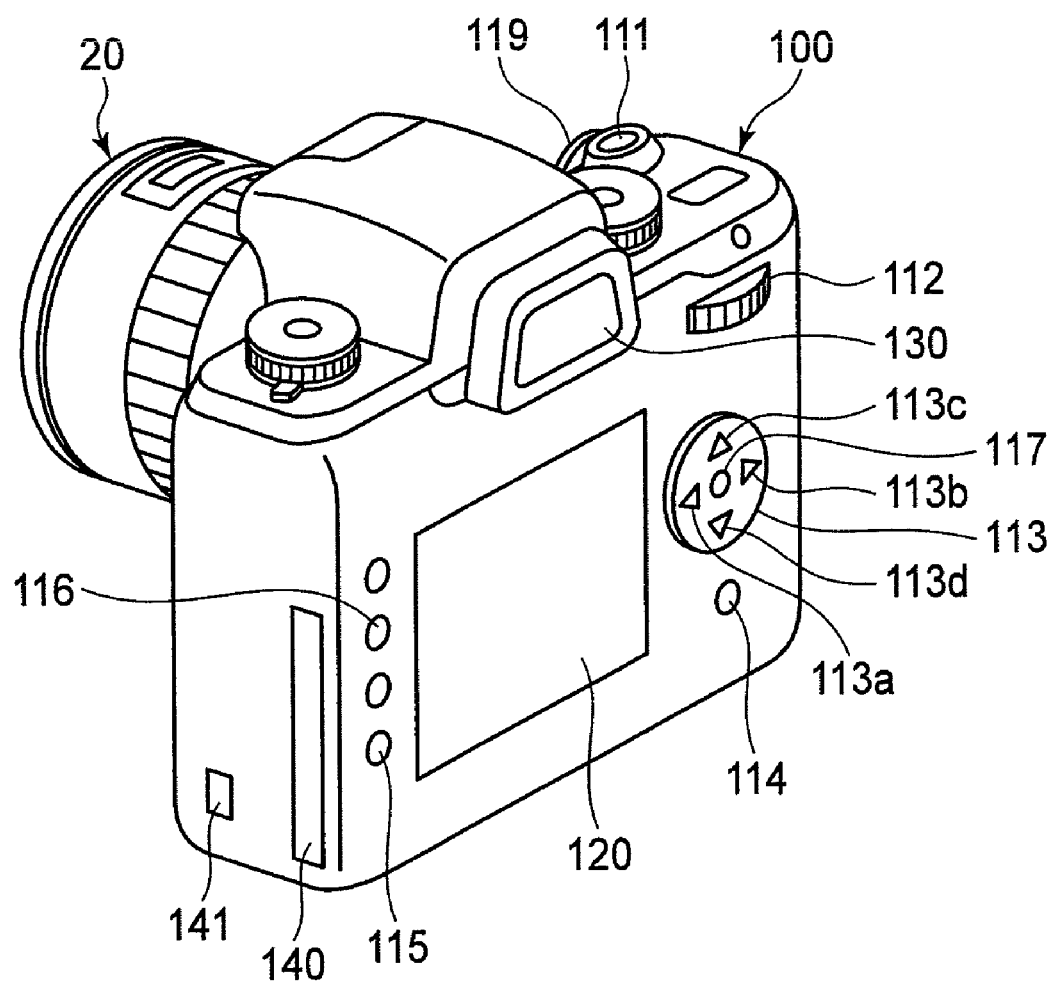
FIG. 1 is an external view of a lens and a digital camera according to the embodiment of the present invention.
Figure 2:
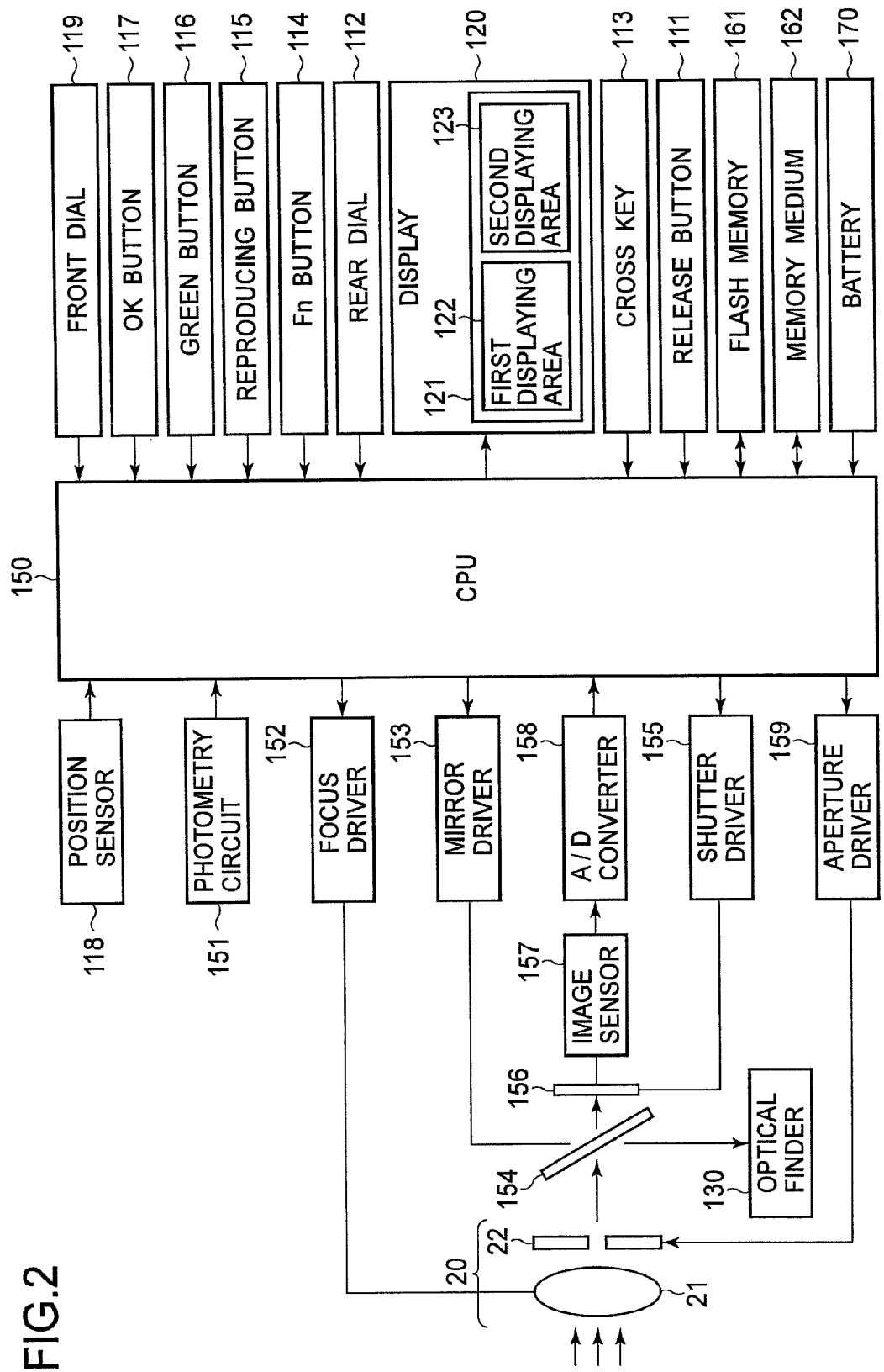
FIG. 2 is a block diagram of the digital camera.

The construction of a digital camera 100 and lens 20 is described with reference to FIGS. 1 and 2.

The digital camera 100 mainly comprises a display 120 which displays a photographed image, a shutter release button 111 which is pressed to photograph an image, a rear dial 112 which is used to operate the digital camera 100 by being rotated, a cross key 113, push buttons 114, 115, 116, 117, a front dial 119, an output terminal 141 which outputs a video signal to an external display, a card slot 140 into which is inserted a memory medium, and an optical finder 130 through which the user watches a subject. These elements are provided on the outer surface of the digital camera 100.

A CPU 150 is provided in the digital camera 100. A flash memory 161 is connected to the CPU 150, and stores programs which the CPU executes. The CPU 20 reads the programs from the flash memory 57 and executes them when the digital camera 10 is powered.

An aperture diaphragm 22 is provided in the lens 20, and controlled by an aperture driver 159 so as to open or close the aperture. A subject image entering through the lens 20 is directed to the optical finder 130 through a return mirror 154. The user finds the subject image through the optical finder 130.

The display 120, the rear dial 112, a cross key 113, a Fn button 114, a reproducing button 115, and a green button 116 are provided on the back surface of the digital camera 100. The rear dial 112, the cross key 113, the Fn button 114, the reproducing button 115, and the green button 116 are provided in the perimeter of the display 120. When the user holds the digital camera 100 with his right hand, he can operate the rear dial 112, the cross key 113, and the Fn button 114 using only the thumb of his right hand while checking the position of the display 120 and these movement input devices 112, 113, 114, 115, and 116 in one glance.

When the user pushes the shutter release button 111 halfway, a photographing preparation signal is sent from the shutter release button 111 to the CPU 150. After receiving the photographing preparation signal, the CPU 150 controls the photometry circuit 151 so as to measure the exposure value. The CPU 20 receives the exposure value, and calculates the exposure information using the exposure value. Exposure information is displayed in a finder display (not shown) which is provided in the optical finder 130. The user examines the exposure information and selects photographing parameters. Photographing parameters include, for example, shutter speed, F-number, and ISO value. Photographing parameters are input by the user by rotating the rear dial 112 on the digital camera 100. As the user rotates the rear dial 112, it offers resistance, i.e., a click for each degree turned. The CPU 150 accepts the photographing parameters and controls shutter speed, F-number, ISO value, and so on.

When the shutter release button 111 is fully depressed by the user, an imaging operation is processed. The imaging operation starts with the transmission of signals to each circuit by the CPU 150 and proceeds to the transmission of image data to the CPU 150. Specifically, CPU 150 sends signals to the aperture driver 159, the mirror driver 153, and the shutter driver 155. The aperture driver 159 controls the aperture diaphragm 22. The mirror driver 153 raises the return mirror 154. The shutter driver 153 opens and closes the shutter curtain 45. The subject image is thereby formed on the image sensor (CCD) 157.

The image sensor 157 captures an image signal, and sends the captured image signal to an A/D converter 158. The aspect ratio of the imaging surface of the image sensor 157 is substantially 2:3, therefore, the aspect ratio of the captured image is substantially 2:3. The A/D converter 158 converts the captured image signal to image data, and sends it to the CPU 150. The CPU 150 processes the image data to an image file, temporarily storing it, and then outputs the image file. In this image processing, the CPU 150 adjusts color contrasts, and compresses it into JPEG format in order to create the image file.

The digital camera 100 comprises an orientation sensor 118 which is used to sense whether it is in horizontal orientation or vertical orientation. The orientation sensor 118 sends a signal to the CPU 150. This signal indicates whether the orientation of the digital camera is in horizontal or vertical. The CPU 150 writes the orientation information of the digital camera in the Exif information of an image file. The image file is stored on the memory medium 162 which is inserted into the card slot 140. The memory medium 162 may be, for example an SD card™, a compact Flash card™, etc. These devices are powered by the battery 170.

The image data stored on the memory medium 162 is displayed on a screen 121 of the display 120 by the user operating the reproducing button 115. The aspect ratio of the screen 121 is approximately 3:4. When the reproducing button 115 is pressed, the digital camera 100 is in reproduction mode. In the reproduction mode, the digital camera 100 initially displays the photographed image which has the newest photographing date and time. If the user presses the left arrow 113a engraved in the cross key 113, the photographed image which has the next newest photographing date and time is displayed on the screen 121. If the user presses the right arrow 113b engraved in the cross key 113, the photographed image which has the next oldest photographing date and time is displayed on the screen 121.

When a photographing image is displayed on the screen 121, the CPU 150 reads the Exif information from the image file, and determines whether the orientation of the photographed image is horizontal or vertical. If the orientation is vertical, the photographed image is rotated ninety degrees counter-clockwise and displayed on the screen 121. If the orientation is horizontal, the photographed image is displayed on the screen 121 without rotation.

As mentioned earlier, the aspect ratio of the screen 121 is approximately 3:4, while the aspect ratio of the photographed image is approximately 2:3. Therefore, a photographed image which is photographed in horizontal orientation is displayed on the screen 121 such that its longer side aligns with the longer side of the screen 121. The magnification factor of the displayed image is defined as 1× in this situation. An image which was photographed in vertical orientation is displayed as such with blank spaces on left and right sides of the screen 121. The magnification factor of the displayed image is set to 0.75× in this situation. A photographed image which is photographed in vertical orientation is named a vertical image; a photographed image which is photographed in horizontal orientation is named a horizontal image.

When the user rotates the front dial 119 towards the right at the moment that the image is displayed on the screen 121, the displayed image skips forward, i.e., the photographed image which has the next newest photographing date and time is displayed on the screen 121. When the user rotates the front dial 119 towards the left, the displayed image skips back, i.e., the photographed image which has the next oldest photographing date and time is displayed on the screen 121.

When the user rotates the rear dial 112 rightward at the moment that the photographed image is displayed on the screen 121, a part of the photographed image is enlarged. The maximum magnification factor is predetermined to be 32×. When the user rotates the rear dial 112 leftward at the moment that the photographed image is enlarged on the screen 121, the photographed image is reduced. The minimum magnification factor predetermined to be 0.75×. The magnification factor is one of 0.75×, 1.0×, 1.2×, 1.4×, 1.7×, 2.0×, 2.4×, 2.8×, 3.4×, 4.0×, 4.8×, 5.7×, 6.7×, 8.0×, 9.5×, 11×, 14×, 16×, or 32×, increased or decreased in one step at a time with each click of the rear dial 112. The enlargement and reduction is processed while fixing the point of the displayed image which is at the center of the display area. Therefore, the center of the photographed image which is displayed on the screen 121 does not change during enlargement or reduction.

When the user pushes the cross key 113 at the moment that the photographed image is enlarged on the screen 121, the photographed image is shifted on the screen 121. When the user presses the up arrow 113c, the screen is shifted towards the top of the displayed image. When the user presses the down arrow 113d, the screen is shifted towards the bottom of the displayed image. When the user presses the left arrow 113a, the screen is shifted towards the left of the displayed image. When the user presses the right arrow 113b, the screen is shifted towards the right of the displayed image.

The digital camera 100 can display two photographed images on the screen 121 at the same time. The behavior of the digital camera 100 when displaying two photographed images is described with refer to FIGS. 3 to 5.

Figure 3:
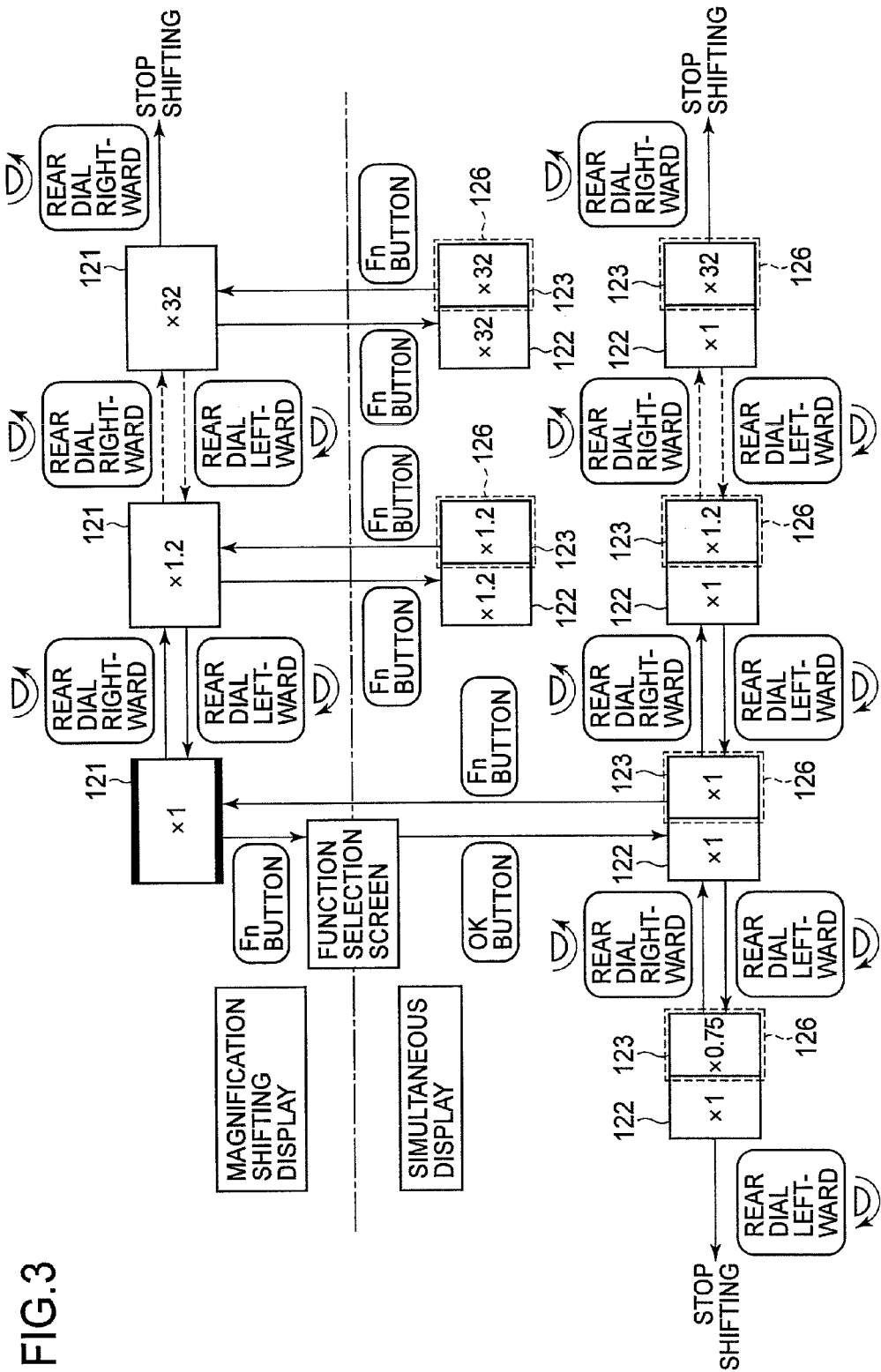
FIG. 3 is a schematic view of a process which magnifies either a first or second photographed image.

FIG. 3 illustrates the behavior that a photographed image is selected from two photographed images which are displayed on the screen 121 and the magnification factor of the selected image is changed. The user can change the screen image by depressing the Fn button 114. When the user depresses the Fn button 114 at the moment that a photographed image is displayed on the screen 121, the screen 121 changes so as to display two images (refer to the upper figures in FIG. 3). When the user depresses the Fn button 114 at the moment that two photographed images are displayed on the screen 121, the screen changes so as to display an image (refer to the upper part of FIG. 3). When the user rotates the rear dial 112 at the moment that a photographed image is selected from the two displayed images, the magnification factor of the selected image is changed (refer to the lower part of FIG. 3).

Figure 4:
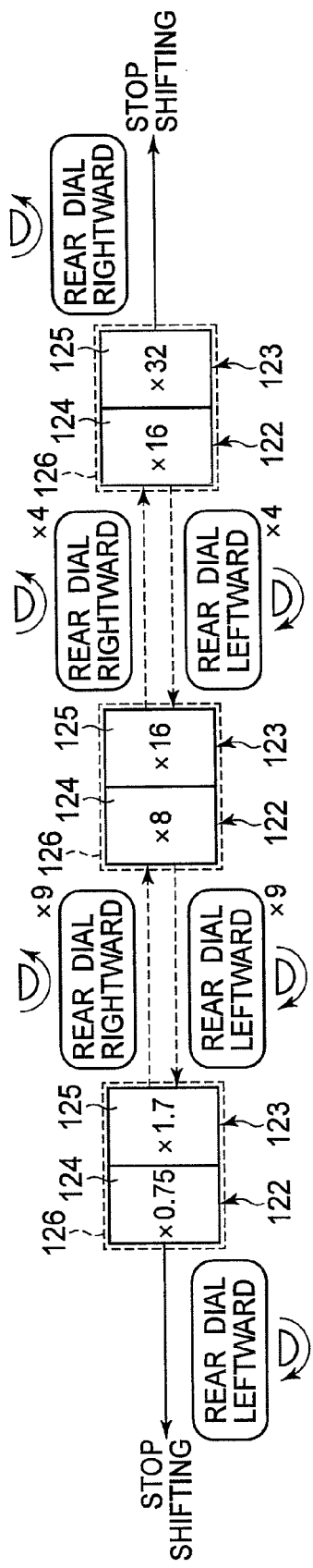
FIG. 4 is a schematic view of a process which simultaneously magnifies both a first and second photographed image.

FIG. 4 illustrates the behavior in which all photographed images displayed on the screen 121 are selected and the magnification factors of the selected images are changed. Each photographed image with its individual magnification factor is selected, and magnified by approximately the same multipliers.

Figure 5:
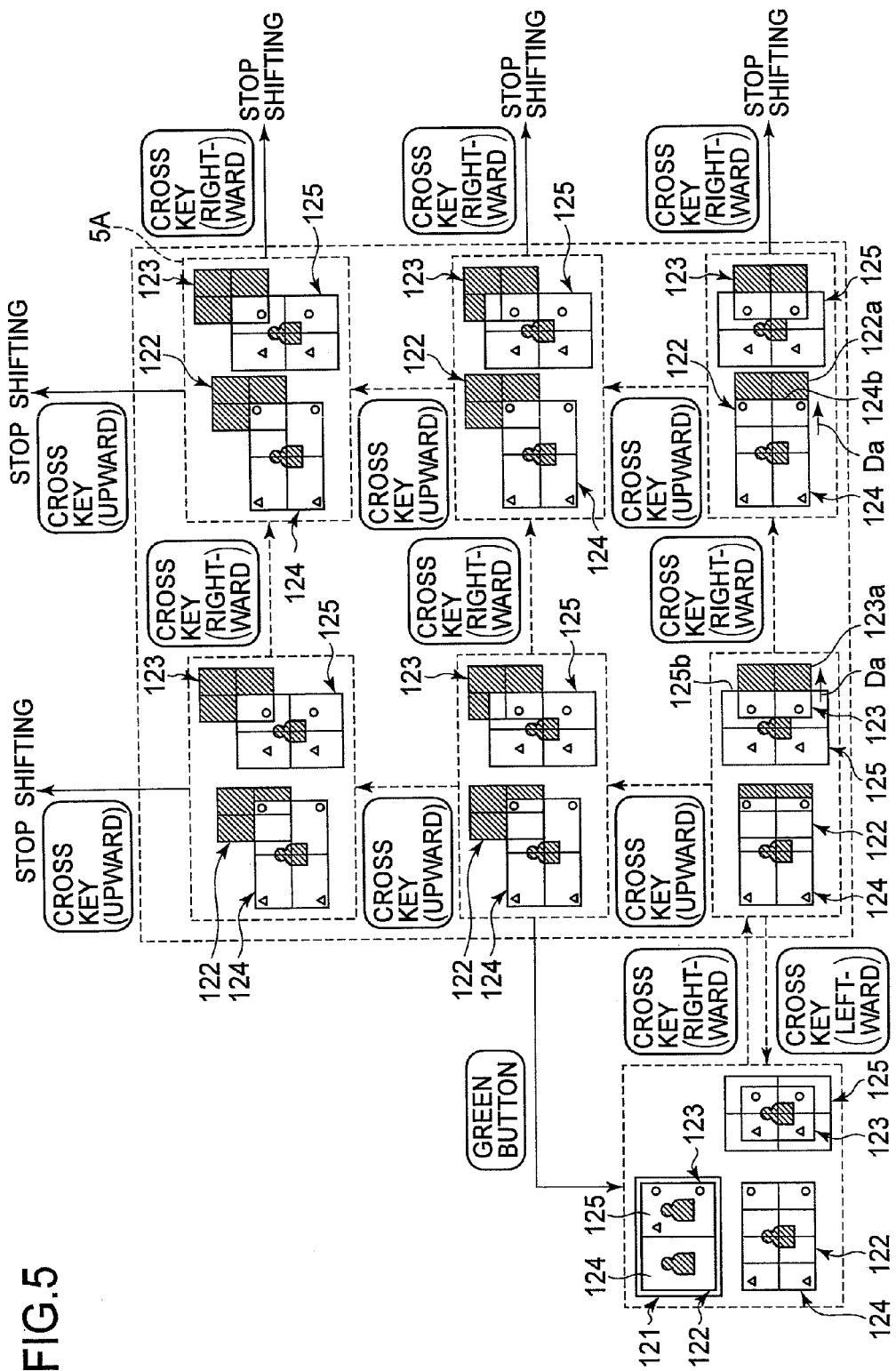
FIG. 5 is a schematic view of a process which simultaneously shifts both a first and second photographed image.

FIG. 5 illustrates the behavior that all photographed images displayed on the screen 121 are selected and the selected images are shifted in the first and second display areas. Block 5A at the top right corner shows that two photographed images reach the movement limit. Other blocks show that only one photographed image reaches the movement limit.

The screen 121 is divided into two side-by-side halves: the first display area 122 and the second display area 123. The first display area 122 displays the first photographed image 124. The second display area 123 displays the second photographed image 125.

The procedure for changing the state of the screen 121 from displaying one image to two is described hereinafter with reference to FIG. 3. If the user depresses the Fn button 114 when an image is displayed on the screen 121 at a magnification factor of one, a function selection screen is displayed on the screen 121. When the user selects the function for displaying two images on the function selection screen by operating the cross key 113, the same photographed image is displayed on both the first and second display areas, 122 and 123. When the user depresses the Fn button 114 when an image is enlarged on the screen 121, the same photographed image is displayed on both the first and second display areas, 122 and 123. In both cases, the magnification factor of the displayed image is not changed during operation of the Fn button 114.

The user selects the first and/or second display areas 122 and 123, and can change, enlarge, reduce, or shift the images displayed on the first and second display areas 122 and 123. A selected display area is encircled by a green colored selection frame 126. The selection frame 126 is indicated by the broken line in FIGS. 3 and 4. If the OK button 117 is depressed when the photographing image is displayed on the first and second display areas 122 and 123, the selection frame 126 moves in order of the first display area 122, the second display area 123, and an area including both the first and second display areas 122 and 123.

When the first and second display areas 122 and 123 display photographed images, the selection frame 126 encircles the second display area 123, i.e., the second display area 123 is selected. The user depresses the OK button 117 so as to move the selection frame 126 and select either the first or second display areas 122 or 123. Then, the photographed image which is displayed on the selected display area by rotating the front dial 119 is advanced. The magnification factor of the newly displayed image is the same as the magnification factor of the forwarded image. That is, when the magnification factor of the already displayed image is 1.2, the magnification factor of the newly displayed image is 1.2. Therefore, the user may easily compare the dimension of the already displayed image with that of the newly displayed image.

As the rear dial 112 is rotated to the right or left while first display area 122 is selected, only the first photographed image 124 is enlarged or reduced. The rear dial 112 is rotated rightward or leftward while the second display area 123 is selected, so that only the second photographed image 125 is enlarged or reduced.

The cross key 113 is operated while the first display area 122 is selected, so that the first display area 122 moves over the first photographed image 124. The cross key 113 is operated while the second display area 123 is selected, so that the second display area 123 moves over the second photographed image 125. The first and second display areas 122 and 123 shift towards the top, bottom, right, or left of the displayed image by depressing the corresponding arrow, 113a, b, c, or d, as in the case that one image were displayed on the screen 121.

Referring to FIG. 4, when the user rotates the rear dial 112 when the first and second photographed images 124 and 125 are selected, both first and second photographed images 124 and 125 are enlarged or reduced. The enlargement and reduction is processed while increasing or decreasing the magnification factors of both displayed images by a predetermined step on the basis of the magnification factors at the moment the displayed images are selected. That is, when the magnification factor of the first photographed image 124 is 0.75 and that of the second photographed image 125 is 1.7, the user rotates the rear dial 112 9 clicks. As a result, the magnification factor of the first photographed image 124 becomes 8 by being increased 9 steps from 0.75, and the magnification factor of the second photographed image 125 becomes 16 by being increased 9 steps from 1.7. The magnification factor of one step is approximately between 1.16 to 1.3, and is decided based on the fourth root of 2 (=1.189).

For example, when the magnification factor of either displayed image reaches 32×, neither of the magnification factors of the displayed images are increased. When the magnification factor of the first photographing image 124 is 16× while the magnification factor of the second photographing image 125 is 32×, the magnification factor of the first photographing image 124 is not increased beyond 16×.

When the first and second display areas 122 and 123 display two horizontal images or a vertical and a horizontal image, both first and second photographed images 124 and 125 are enlarged or reduced as mentioned previously. For example, when the magnification factor of one displayed image reaches 0.75×, both the magnification factors of the displayed images are not decreased. When the magnification factor of the second photographing image 125 is 1.7× while the magnification factor of the first photographing image 124 is 0.75×, the magnification factor of the first photographing image 124 is not decreased beyond 1.7×.

Therefore, the size of subjects displayed on the first or second display areas 122 and 123 is always nearly the same.

The cross key 113 is operated while the first and second display areas 122 and 123 are selected, so that the first and second display areas 122 and 123 simultaneously shift by the same displacement (refer to FIG. 5). The displacement is represented by the pixel number of the screen 121. The cross key 113 is operated by depressing one of the arrows 113a-113d, as in the case that one image is displayed on the screen 121. Note that when the magnification factors of the first and second photographed images 124 and 125 differ, the first and second display areas 122 and 123 shift by the same displacement.

Each first and second display areas 122 and 123 have movement limits. The movement limits are the centers of the edges of the first and second display areas 122 and 123.

The second display area 123 shifts in the arrow Da direction by the depression of the right arrow 113b until the center of the edge 123a of the second display area 123 crosses the edge 125b of the second photographing image 125, so that the second display area 123 is stopped from shifting in the direction of the arrow Da. On the other hand, the first display area 122 does not reach the movement limit, and can shift in the direction of the arrow Da. The first display area 122 can shift in the direction of the arrow Da until the center of the edge 122a of the first display area 122 crosses the edge 124b of the first photographing image 124. The first display area 122 may likewise shift upward, downward, rightward, and leftward.

Therefore, the photograph does not drop out from the first and second display areas 122 and 123. Moreover, a movement limit is provided in the center of an edge of the first and second display areas 122 and 123, so that the user may easily recognize the edges of the first and second photographed images 124 and 125.

In the case the user depresses the green button 116 while the first and second photographing images 122 and 123 are displayed, the first and second photographing images 122 and 123 are centered in the first and second display areas 122 and 123.

In the case the user depresses the Fn button 114 when the first and second photographing images 122 and 123 are displayed, the first photographing image 122 is displayed on the screen 121.

Figure 6:
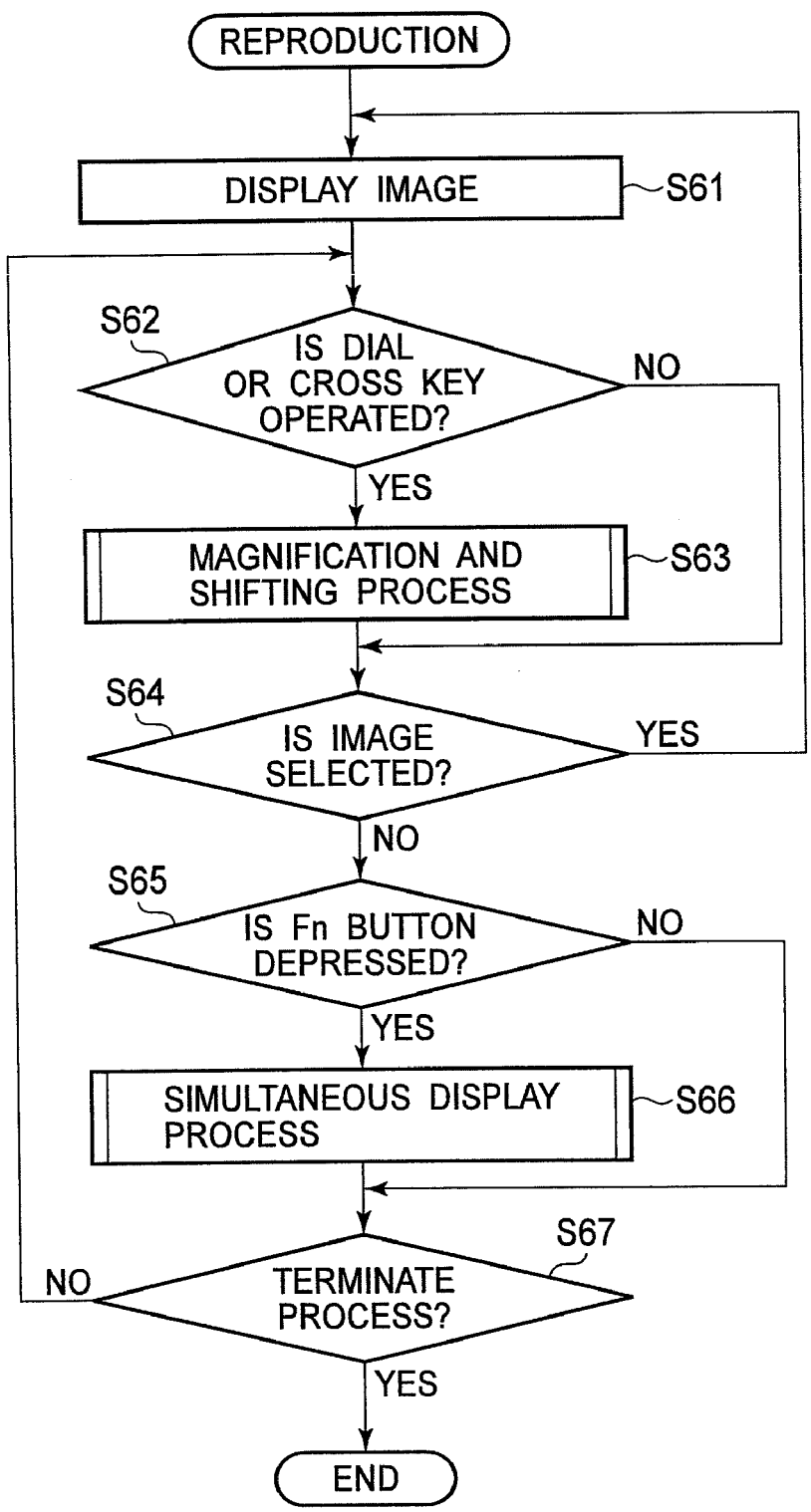
FIG. 6 is a flowchart showing a reproduction process.

The image reproduction process is described with reference to FIG. 6. The image reproduction process is executed by the CPU 150 when the reproducing button is depressed.

In step S61, a photographing image is displayed on the screen 121. In step S62, it is determined whether the rear dial 112 or the cross key 113 has been operated. When they are operated, the process executes step S63. In the case that they have not operated, the process proceeds to step S64 without the execution of step S63. In step S63, a magnification and shifting process is executed in step S63.

In step S64, it is determined whether the second photographed image 125 is selected or not. The second photographed image 125 is selected using the cross key 113. In the case that the second photographing image 125 is not selected, the process proceeds to step S65. Otherwise, the process proceeds to step S61.

In step S65, it is determined whether the user has selected to simultaneously display the first and second photographed images 124 and 125 by operating the Fn button 114. In the case that the user has done so, a simultaneous display process is executed in step S66. Otherwise, it is determined whether the process is to be terminated or not in step S67. The CPU 150 terminates the reproduction process when the digital camera powered off, or when the operating mode of the digital camera 150 is changed to the photographing mode. The photographing mode is an operating mode of the digital camera 150 which can photograph a subject. In the case that the process is not terminated, the process proceeds to step S62.

Figure 7:
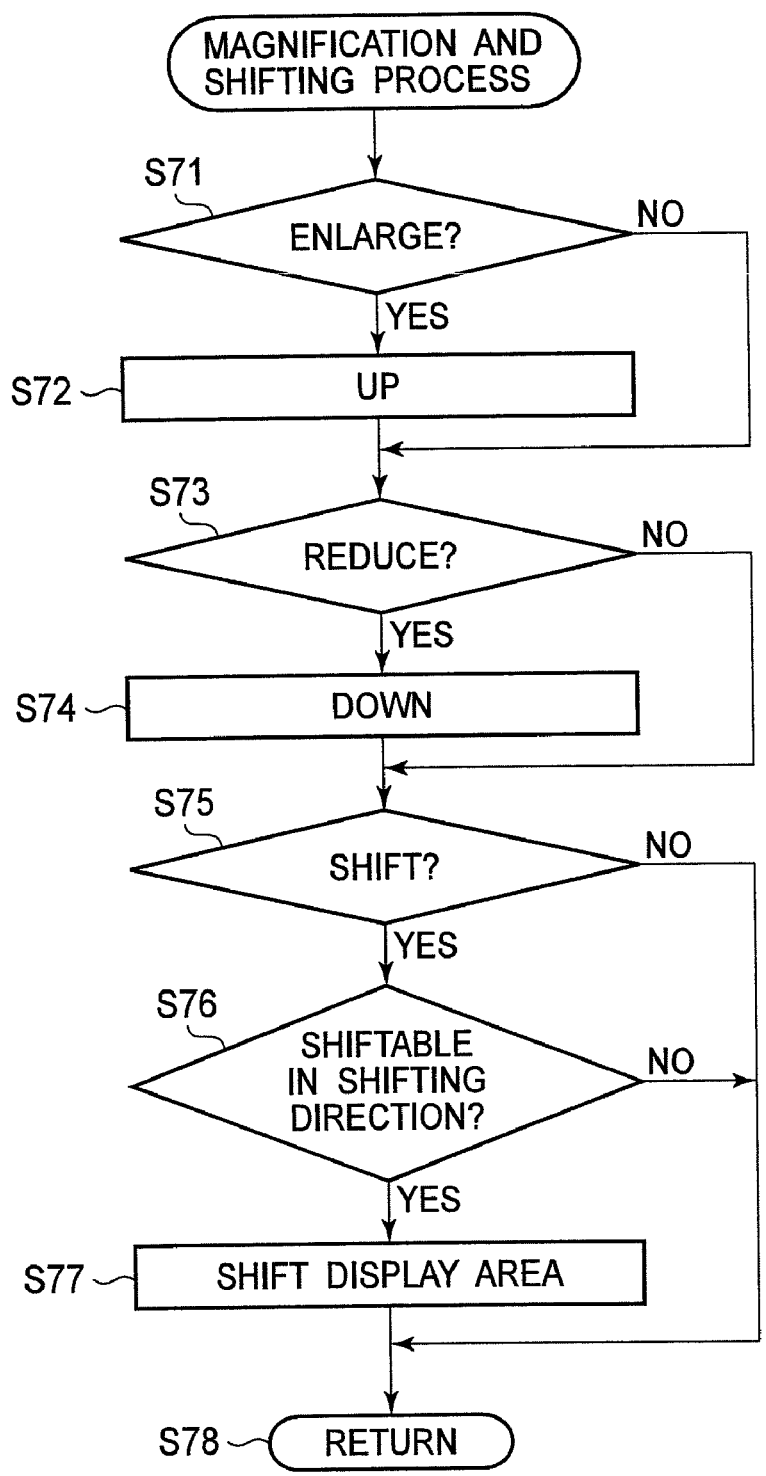
FIG. 7 is a flowchart showing a magnification and shifting process.

The magnification and shifting process is described with reference to FIG. 7. The magnification and shifting process is executed in step S63 in the reproduction process in FIG. 6.

In step S71, it is determined whether an enlargement operation should be executed or not, i.e., whether the rear dial 112 has been rotated rightward or not. When the rear dial 112 is rotated one click, the displayed image is enlarged, i.e., the magnification factor is increased by one step. In the case that the rear dial 112 is not rotated, step S72 is not executed and the process advances to step S73.

In step S73, it is determined whether a reduction operation is executed or not, i.e., whether the rear dial 112 is rotated leftward or not. When the rear dial 112 is rotated one click, the displayed image is reduced, i.e., the magnification factor is deceased by one step. In the case that the rear dial 112 is not rotated, the step S74 is not executed and the process advances to step S75.

In step S75, it is determined whether a shifting operation is executed or not, i.e., whether the cross key 113 has been operated or not. If the cross key 113 has been operated, it is determined whether a display area can be shifted in the direction input by the cross key 113 or not in step S76, i.e., whether the photographed image has reached a movement limit or not. In the case that a display area can be shifted, the process proceeds to step S77 and shifts the display area. Then the process proceeds to step S78. In the case that the display area can not be shifted, the process proceeds to step S78 without shifting the display area. In step S78, the magnification and shifting process is terminated, and returns to step S64 in the reproduction process.

Figure 8:
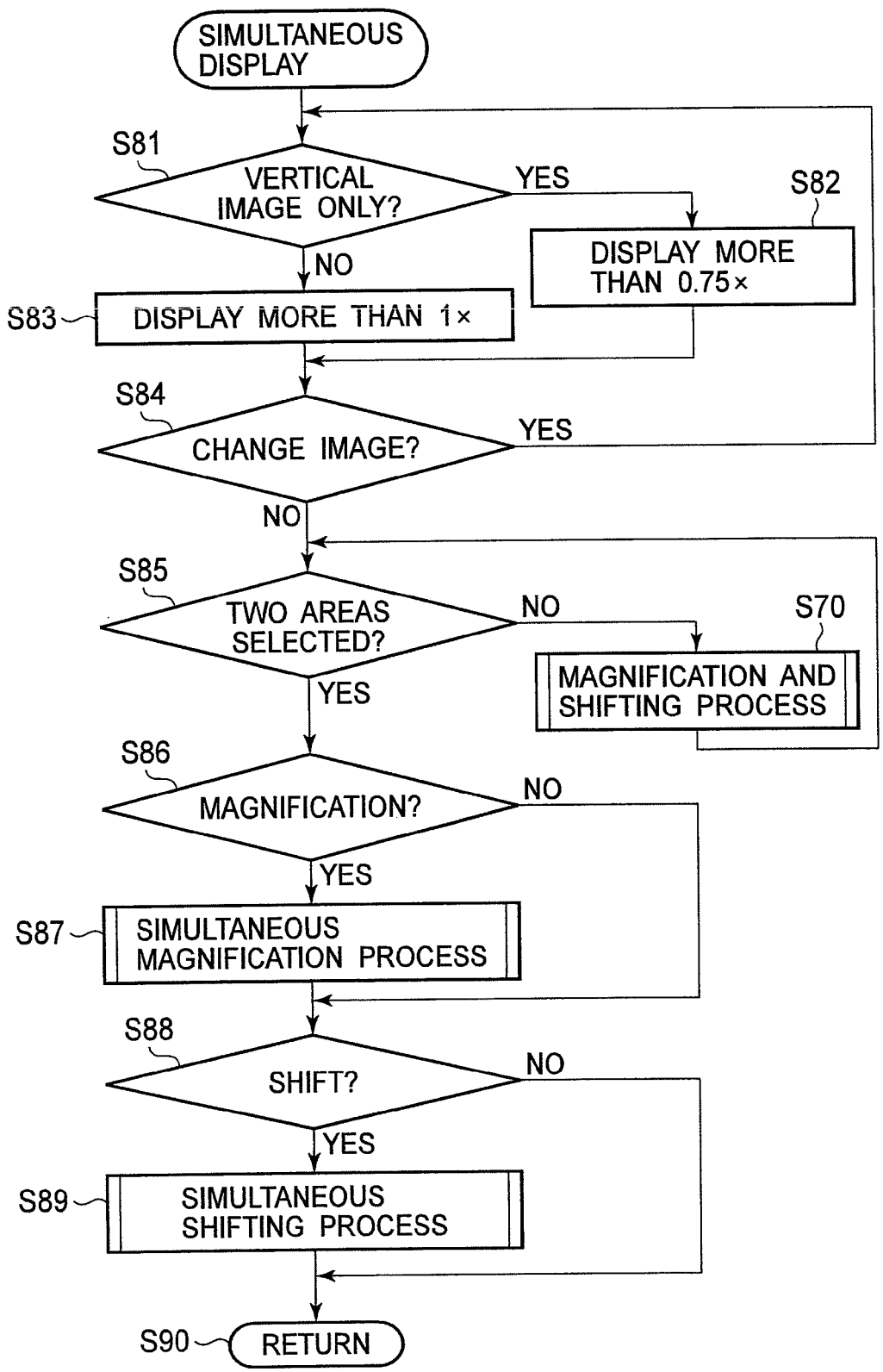
FIG. 8 is a flowchart showing a simultaneous display process.

The simultaneous display process is described with reference to FIG. 8. The simultaneous display process is executed in step S66 in the reproduction process in FIG. 6.

In step S81, it is determined whether photographed images to be displayed are vertical images only or not. In the case they are vertical images only, the minimum magnification factor is set to 0.75×, and they are displayed in the first and second display areas 122 and 123 at the minimum magnification factor of 0.75. If photographed images include at least one horizontal image, the minimum magnification factor is set to 1× in step S83, and they are displayed on the first and second display areas 122 and 123 at the minimum magnification factor of 1.

In the following step, S84, it is determined whether a photographed image displayed in the first or second display areas 122 and 123 has been changed. In the case it has been changed, the process proceeds to step S81. Thus, the magnification factors of images displayed in the first and second display areas 122 and 123 are adjusted. The photographed image to be newly displayed is displayed with the same magnification factor of the already displayed image. In other words, if the magnification factor of the already displayed image is sixteen, the magnification factor of the newly displayed image will also be sixteen.

In the case the photographed image has not been changed, the process proceeds to step S85. In step S85, it is determined whether both the first and second display areas 122 and 123 are selected or not. If both areas are not simultaneously selected, the process proceeds to step S70. The magnification and shifting process is executed on the photographed image to be displayed in the selected display area in step S70 because only one display area is selected if both areas are not selected. After the magnification and shifting process is executed, the process returns to step S85.

In step S86, it is determined whether an enlargement or reduction operation will be executed or not, i.e., whether the rear dial 112 has been rotated or not. If the rear dial 112 has been rotated, the simultaneous magnification process described below is executed in step S87, and the process proceeds to step S88. If the rear dial 112 has not been rotated, the process proceeds to step S88 without the execution of step S87.

In step S88, it is determined whether display areas will be shifted or not, i.e., whether the cross key 113 has been operated or not. If the cross key 113 has been operated, a simultaneous shifting process described below is executed in step S89, and the process proceeds to step S90. If the cross key 113 is not operated, the process proceeds to step S90 without executing step S89.

In step S90, the simultaneous display process is terminated, and the process returns to step S66 of the reproduction process.

Figure 9:
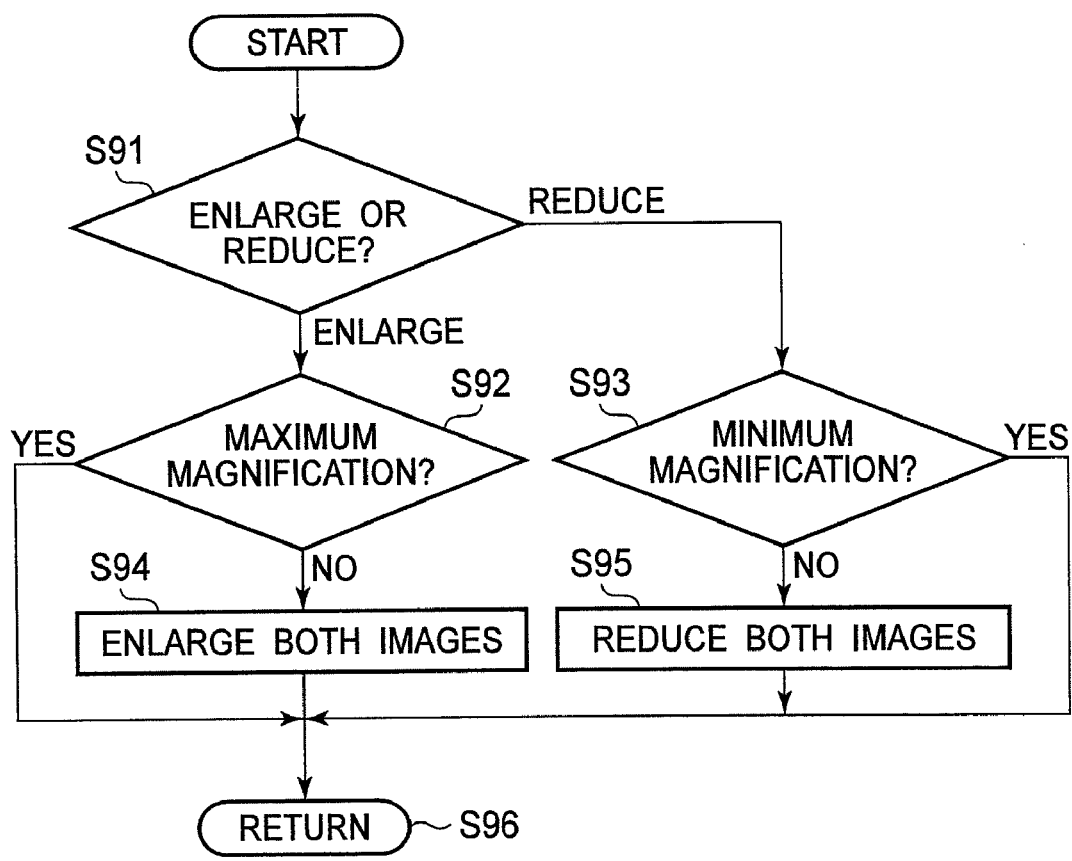
FIG. 9 is a flowchart showing a simultaneous magnification process.

The simultaneous magnification process is described with reference to FIG. 9. The simultaneous magnification process is executed in step S87 in the simultaneous display process in FIG. 8.

In step S91, it is determined whether the magnification factor is to be changed to enlargement or reduction, i.e., whether the rear dial 112 has been rotated rightward or leftward. If the rear dial 112 has been rotated rightward, it is determined that the magnification factor should be changed to enlargement and the process proceeds to step S92. If the rear dial 112 is rotated leftward, it is determined that magnification factor must be changed to reduction and the process proceeds to step S93.

In step S92, it is determined whether at least one photographed image displayed in the first and second display areas 122 and 123 is currently displayed at the maximum magnification factor or not. If at least one photographed images is displayed at the maximum magnification factor, the process proceeds to step S96. If at least one photographed images is not displayed by the maximum magnification factor, the process proceeds to step S94. In step S94, the magnification factors of the two photographed images are increased by one step. Thus, the two photographed images are simultaneously enlarged.

In step S93, it is determined whether at least one photographed image displayed in the first and second display areas 122 and 123 is currently displayed at the minimum magnification factor or not. If at least one photographed images is displayed at the minimum magnification factor, the process proceeds to step S96. In the case that at least one photographed images is not displayed at the minimum magnification factor, the process proceeds to step S95. In step S95, the magnification factors of the two photographed images are decreased by one step. Thus, the two photographed images are simultaneously reduced.

In the case that at least one photographed image is displayed at the maximum magnification factor in step S92, i.e., the maximum magnification factor of either photographed image reaches 32×, the magnification factors of two displayed images are not increased. For example, if the magnification factor of the first photographed image 124 is 16× when the magnification factor of the second photographed image 125 is 32×, the magnification factor of the first photographed image 124 is not increased beyond 16×.

In the case that at least one photographed image is displayed at the minimum magnification factor in step S93, i.e., the minimum magnification factor of either photographed image reaches 0.75× or 1×, the magnification factors of two displayed images are not decreased. For example, if the magnification factor of the first photographed image 124 is 0.75× when the magnification factor of the second photographed image 125 is 1.7×, magnification factor of the first photographed image 124 is not decreased beyond 1.7×.

Thus, if at least one photographed image is displayed at the maximum or minimum magnification factor in step S92 or S93, the process proceeds to step S96 without changing the magnification factors of the two displayed images.

After steps S94 and S95 end, the process proceeds to step S96, returning to the simultaneous display process.

According this process, two photographed images are simultaneously enlarged or reduced.

Figure 10:
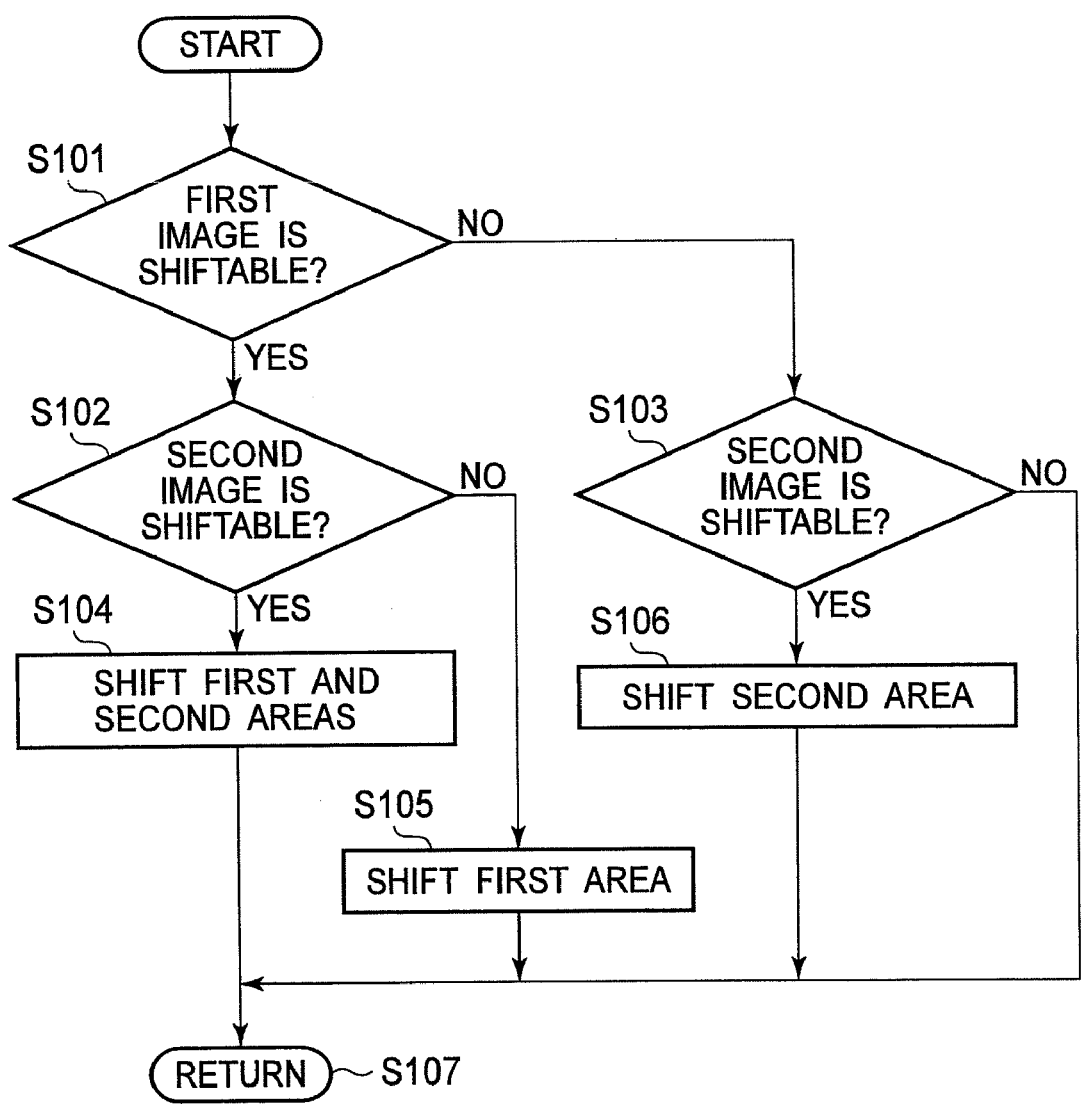
FIG. 10 is a flowchart showing a simultaneous shifting process.
Figure 11:
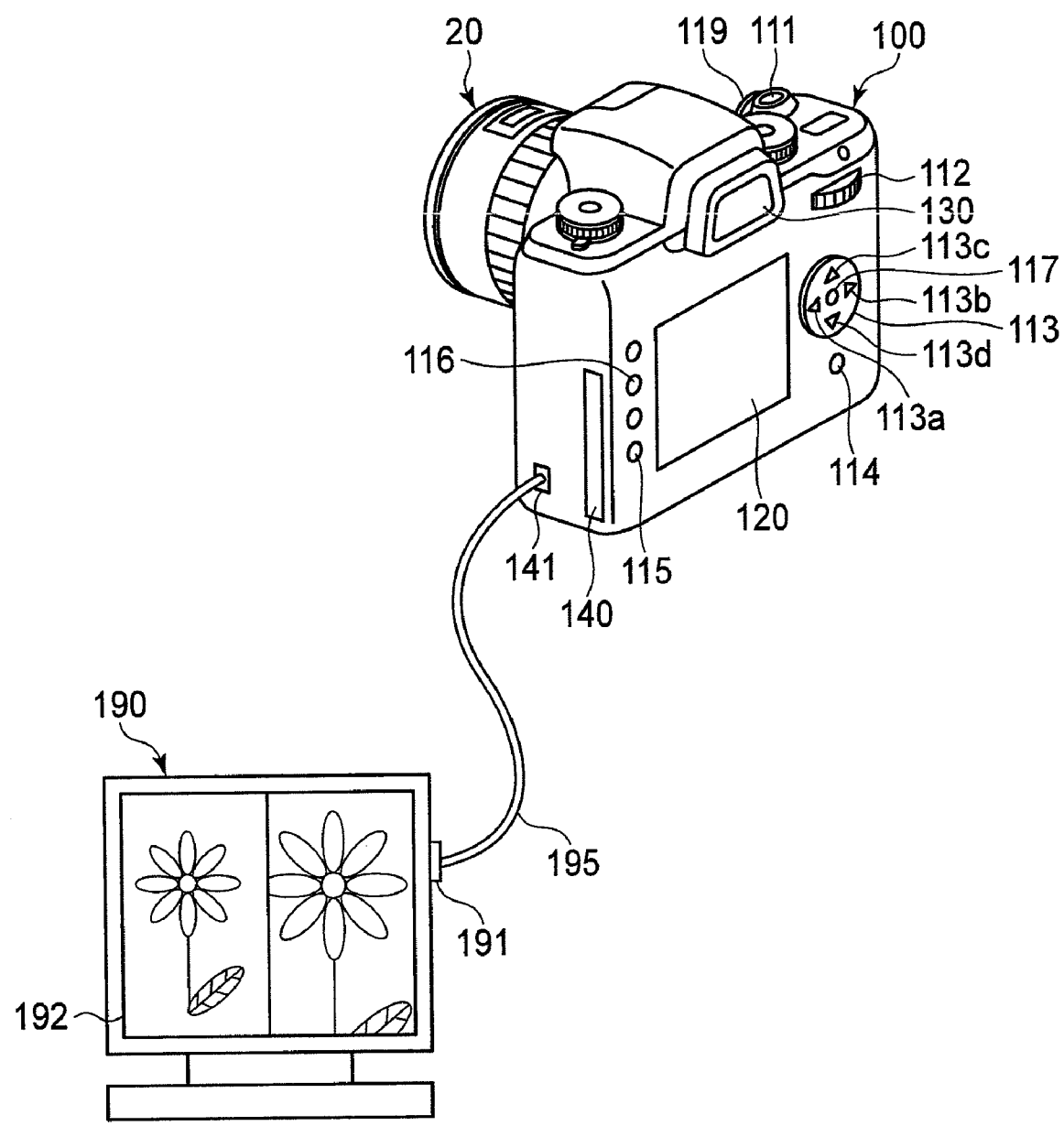
FIG. 11 is a schematic view of a digital camera and an external display which is connected to a digital camera.

The simultaneous shifting process is described with reference to FIG. 10. The simultaneous shifting process is executed in step S88 in the simultaneous display process in FIG. 8.

In step S101, it is determined whether the first photographed image 124 can be shifted in the direction which has been input by the cross key 113. If the first photographed image 124 can be shifted, i.e., the first photographed image 124 does not reach the movement limit of the first display area 122, then the process proceeds to step S102. If the first photographed image 124 can not be shifted, i.e., the first photographed image 124 reaches the movement limit of the first display area 122, the process proceeds to step S103.

In step S102, it is determined whether the second photographed image 125 can be shifted in the direction which has been input by the cross key 113. If the second photographed image 125 can be shifted, i.e., the second photographed image 125 does not reach the movement limit of the second display area 123, the process proceeds to step S104. If the second photographed image 125 can not be shifted, i.e., the second photographed image 125 reaches movement limit of the second display area 123, the process proceeds to step S105.

In step S104, the first and second display areas 122 and 123 are shifted in the direction which has been input by the cross key 113. In step S105, the first display area 122 is shifted in the direction which has been input by the cross key 113.

In step S103, it is determined whether the second photographed image 125 can be shifted in the direction which has been input by the cross key 113 or not. If the second photographed image 125 can be shifted, i.e., the second photographed image 125 does not reach the movement limit of the second display area 123, the process proceeds to step S106. If the second photographed image 125 can not be shifted, i.e., the second photographed image 125 reaches the movement limit of the second display area 123, the process proceeds to step S107 without shifting the first and second display areas 122 and 123.

In step S106, the second display area 123 is shifted in the direction which has been input by the cross key 113.

After step S104, S105, and S106 end, the process proceeds to step S107 and returns to the simultaneous display process.

According to this process, the user can easily refer photographed images which are displayed on the screen 121.

An embodiment of an image-displaying system according to the present invention is described below with reference to the accompanying figures.

The image-displaying system comprises the digital camera 100 and an external display 190. The digital camera 100 comprises an output terminal 141. The external display 190 may be a television 190. The television 190 has an input terminal 191 which can receive composite video signal, and a screen 192 which displays images. A signal cable 195 connects the output terminal 141 and the input terminal 191.

The digital camera outputs photographed images as composite video signal through the output terminal 141. The photographed images are the same as the images which are processed by the reproduction process, the magnification and shifting process, the simultaneous display process, the simultaneous magnification process, and the simultaneous shifting process. Composite video signal is transmitted to the input terminal through the signal cable 195. The television 190 receives composite video signal through the input terminal 191, and displays photographed images on the screen 192.

Therefore, the user can refer to an image with the external display 192 having a larger area than the screen 120.

Note that a signal output from the output terminal 141 may be an S-Video signal, a component video signal, an RGB signal, or some signal that can transmit video. If the output terminal 141 outputs S-Video signal, the signal cable 195 may be the S-Video input terminal of a television. If the output terminal 141 outputs RGB signal, the signal cable 195 may be the RGB input terminal of a computer display.

Note that the image sensor 40 may be any device that converts light to an electrical signal, e.g., a CCD, or a CMOS chip.

Although the embodiment of the present invention has been described herein with reference to the accompanying drawings, obviously many modifications and changes may be made by those skilled in the art without departing from the scope of the invention.

The present disclosure relates to subject matter contained in Japanese Patent Application No. 2007-325067 (filed on Dec. 17, 2007), which is expressly incorporated herein, by reference, in its entirety.

The invention claimed is:

1. A digital camera comprising:
   a display that simultaneously displays plural images;
   a magnification input device that is used to input a magnification factor for each of the images displayed in said display; and
   a magnification controller that selectively enlarges or reduces any one or more than one of the images and that simultaneously changes a magnification of the plural images displayed in said display by substantially the same multiplier according to the magnification factor input by said magnification input device, wherein said magnification controller determines an individual minimum magnification factor that is used for displaying an image on said display, the minimum magnification factor being determined based on an aspect ratio of the image and said magnification controller selects the largest factor among the individual minimum magnification factors of all of the images that are simultaneously displayed on said display, and determines the largest factor to be the minimum magnification factor for all of the images displayed on said display, when said display changes displayed images from one image to plural images that have respectively different aspect ratios.

2. The digital camera according to claim 1, further comprising a selector that selects plural images from the plural images displayed on said display, and wherein said magnification controller simultaneously changes the magnification of the images selected by said selector by substantially the same multiplier according to the magnification factor input by said magnification input device.

3. The digital camera according to claim 2, wherein when the magnification factor is set to the maximum of said display, said magnification controller stops changing the magnification factor of the selected image when said selector selects an image from among the plural images displayed on said display and at least one image is displayed at the maximum magnification factor.

4. The digital camera according to claim 2, wherein when the magnification factor is set to the minimum of said display, said magnification controller stops changing the magnification factor of the selected images when said selector selects plural images from the plural images displayed on said display and at least one selected image is displayed at the minimum magnification factor.

5. The digital camera according to claim 1, further comprising a selector that selects an image from among the plural images displayed on said display, said magnification controller simultaneously changing the magnification of the selected image selected by said selector by the magnification factor input by said magnification input device.

6. The digital camera according to claim 1, wherein said display has plural display areas in which each image is displayed, said magnification controller changing the magnification of a displayed image while keeping a center of the displayed image at a center of the display area.

7. The digital camera according to claim 6, wherein said display has two display areas of equal dimensions.

8. The digital camera according to claim 1, the magnification input device being configured to input a different magnification factor for each of the plural images displayed in the display and the magnification controller being configured to simultaneously change the magnification of the plural images displayed in the display by substantially the same multiplier applied to the different magnification factors input by the magnification input device for each of the plural images.

9. The digital camera according to claim 1, the magnification controller being configured to enlarge or reduce the magnification of each of the plural images by a predetermined number of steps, each step causing a predetermined change in the magnification factor in accordance with an exponential relationship.

10. An image viewer comprising:
a display that simultaneously displays plural images;
a magnification input device that is used to input a magnification factor for each of the images displayed in said display; and
a magnification controller that selectively enlarges or reduces any one or more than one of the images and that simultaneously changes the magnification of the plural images displayed in said display by substantially the same multiplier according to the magnification factor input by said magnification input device; and
a selector that selects at least one image from among the plural images displayed on said display;
said selector being provided on the perimeter of said display;
said magnification controller changing the magnification of the image selected by said selector,
wherein said magnification controller determines an individual minimum magnification factor that is used for displaying an image on said display, the minimum magnification factor being determined based on an aspect ratio of the image and
said magnification controller selects the largest factor among the individual minimum magnification factors of all of the images that are simultaneously displayed on said display, and determines the largest factor to be the minimum magnification factor for all of the images displayed on said display, when said display changes displayed images from one image to plural images that have respectively different aspect ratios.

11. The image viewer according to claim 10, the magnification input device being configured to input a different magnification factor for each of the plural images displayed in the display and the magnification controller being configured to simultaneously change the magnification of the plural images displayed in the display by substantially the same multiplier applied to the different magnification factors input by the magnification input device for each of the plural images.

12. The image viewer according to claim 10, the magnification controller being configured to enlarge or reduce the magnification of each of the plural images by a predetermined number of steps, each step causing a predetermined change in the magnification factor in accordance with an exponential relationship.

13. The image viewer according to claim 10, wherein the display includes plural display areas in which each image is displayed, the magnification controller changing the magnification of a displayed image while keeping a center of the displayed image at a center of the display area.

14. The image viewer according to claim 10, wherein, when the magnification factor is set to the maximum of said display, said the magnification controller stops changing the magnification factor of the selected image when the selector selects an image from among the plural images displayed on the display and at least one image is displayed at the maximum magnification factor.

15. The image viewer according to claim 10 wherein, when the magnification factor is set to the minimum of the display, the magnification controller stops changing the magnification factor of the selected image when the selector selects an image from among the plural images displayed on the display and at least one image is displayed at the minimum magnification factor.

16. An image-displaying system comprising:
a digital camera that has an output device which outputs a video signal; and an external display that is provided externally of said digital camera;

said display having a receiver which receives the video signal which is sent from the output device and displays plural images simultaneously;

said digital camera having a magnification input device that is used to input the magnification factor for each of the images displayed in said display, and a magnification controller that selectively enlarges or reduces any one or more than one of the images and that simultaneously changes the magnification of the images displayed in said display by substantially the same multiplier according to the magnification factor input by said magnification input device, wherein said magnification controller determines an individual minimum magnification factor that is used for displaying an image on said display, the minimum magnification factor being determined based on an aspect ratio of the image and said magnification controller selects the largest factor among the individual minimum magnification factors of all of the images that are simultaneously displayed on said display, and determines the largest factor to be the minimum magnification factor for all of the images displayed on said display, when said display changes displayed images from one image to plural images that have respectively different aspect ratios.

17. The image displaying system according to claim 16, the magnification input device being configured to input a different magnification factor for each of the plural images displayed in the display and the magnification controller being configured to simultaneously change the magnification of the plural images displayed in the displayed by substantially the same multiplier applied to the different magnification factors input by the magnification input device for each of the plural images.

18. The image displaying system according to claim 16, the magnification controller being configured to enlarge or reduce the magnification of each of the plural images by a predetermined number of steps, each step causing a predetermined change in the magnification factor in accordance with an exponential relationship.

19. The image displaying system according to claim 16, the display including plural display areas in which each image is displayed, the magnification controller changing the magnification of a displayed image while keeping a center of the displayed image at a center of the display area.

20. The image displaying system according to claim 16, wherein, when the magnification factor is set to either a maximum or a minimum of the display, the magnification controller stops changing the magnification factor of an image selected by a selector when the selector selects an image from among the plural images displayed on the display and at least one image is displayed at one of the maximum or the minimum magnification factors.

* * * * *